United States Patent
Yang et al.

(10) Patent No.: US 9,217,675 B2
(45) Date of Patent: Dec. 22, 2015

(54) ELECTRONIC DEVICES WITH TEMPERATURE SENSORS

(71) Applicant: Apple Inc., Cupertino, CA (US)

(72) Inventors: Henry H. Yang, Los Gatos, CA (US); Matthew E. Last, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 337 days.

(21) Appl. No.: 13/658,690

(22) Filed: Oct. 23, 2012

(65) Prior Publication Data

US 2014/0112371 A1 Apr. 24, 2014

(51) Int. Cl.
*G01K 7/00* (2006.01)
*G01K 1/16* (2006.01)
*G01K 13/00* (2006.01)

(52) U.S. Cl.
CPC .. *G01K 7/00* (2013.01); *G01K 1/16* (2013.01); *G01K 13/00* (2013.01)

(58) Field of Classification Search
USPC .......................................... 374/179, 208, 163
See application file for complete search history.

(56) References Cited

U.S. PATENT DOCUMENTS

| | | | |
|---|---|---|---|
| 2002/0048308 A1* | 4/2002 | Knittel et al. | 374/141 |
| 2005/0058179 A1* | 3/2005 | Phipps | 374/208 |
| 2005/0212824 A1 | 9/2005 | Marcinkiewicz et al. | |
| 2006/0043086 A1 | 3/2006 | Li et al. | |
| 2010/0292923 A1 | 11/2010 | Zhang | |
| 2012/0076171 A1* | 3/2012 | Wu | 374/183 |
| 2014/0112510 A1* | 4/2014 | Yang et al. | 381/332 |

FOREIGN PATENT DOCUMENTS

JP 04083453 A * 3/1992
WO 2007084078 7/2007

* cited by examiner

*Primary Examiner* — Mirellys Jagan
(74) *Attorney, Agent, or Firm* — Treyz Law Group, P.C.; Kendall P. Woodruff; Joseph F. Guihan

(57) ABSTRACT

An electronic device may be provided with electronic components such as buttons and environmental sensors. An environmental sensor may be temperature sensor for gathering temperature data associated with the environment surrounding the device. The temperature sensor may be mounted to a button member for the button. The button member may be an actuating member that moves within an opening in a device housing and that extends beyond an outer surface of the housing into the surrounding environment. The button member may be arranged so that an internal electronic switch is activated when the button member is moved within the opening. The button member may be thermally isolated from other device structures using insulating material on the button member. The button member may be formed from a thermally conductive material that transmits the temperature of environmental materials that contact the button member to the temperature sensor.

14 Claims, 6 Drawing Sheets

ELECTRONIC DEVICES WITH TEMPERATURE SENSORS

BACKGROUND

This relates generally to electronic devices and, more particularly, to electronic devices with environmental sensors.

Electronic devices such as cellular telephones, portable computers, and tablet computers are sometimes provided with environmental sensors. For example, cellular telephones are sometimes provided with a thermometer for sensing the temperature of the environment in the vicinity of the device.

Environmental sensors such as thermometers are typically mounted in an open port that allows interaction between the environment and the sensor. However, providing additional open ports for environmental sensors can increase the risk of unwanted environmental materials such as moisture entering the device.

It would therefore be desirable to be able to provide improved electronic devices with environmental sensors.

SUMMARY

An electronic device may be provided with electronic components such as environmental sensors and user input components.

An environmental sensor may be a temperature sensor such as a thermometer. User input components may include buttons, switches, or other user input components such as display, speakers, touch-sensitive components or other components for accepting input from, or transmitting information to, a user.

Buttons may include actuating members that move within openings in a housing structure for the device. For example, a housing structure may have an opening that allows a button member to move relative to the housing structure in the opening. As the button member moves within the opening, the button member may actuate an associated electronic switch located interior to the housing structure.

Actuating members such as button members may be thermally isolated from heat generating components of the device. Button members may also include portions that extend from an edge of the device into the surrounding environment. A temperature sensor may be mounted to, or embedded within a button member. In this way, electronic devices may be provided having temperature sensors that are thermally isolated from the device and that are at least partially embedded in the surrounding environment for which temperature information is desired.

Further features of the invention, its nature and various advantages will be more apparent from the accompanying drawings and the following detailed description of the preferred embodiments.

DETAILED DESCRIPTION

An electronic device may be provided with electronic components such as buttons, switches, displays, speakers, microphones, and environmental sensors.

An electronic device may use one or more environmental sensors to gather environmental data associated with the environmental conditions surrounding the device. As an example, an electronic device may use a temperature sensor (sometimes referred to as a thermometer) that is mounted to a thermally conductive portion of a button member to gather temperature data. The temperature data may be generated based on voltages, currents, or other electrical signals generated by the temperature sensor in response to environmental materials that contact the thermally conductive portion of the button member. Environmental materials may include the air surrounding the device, a user's finger, another part of a user's body, or any other material for which it is desired to measure the temperature.

The temperature data may be converted into a temperature and provided to the user (e.g., using a display such as a liquid crystal display or an organic light-emitting diode display) or may be used in operating the device (e.g., control circuitry in the device may place the device in a safe mode of operation in response to a detected temperature that is outside of a predetermined safe range of operating temperatures).

Figure 1:
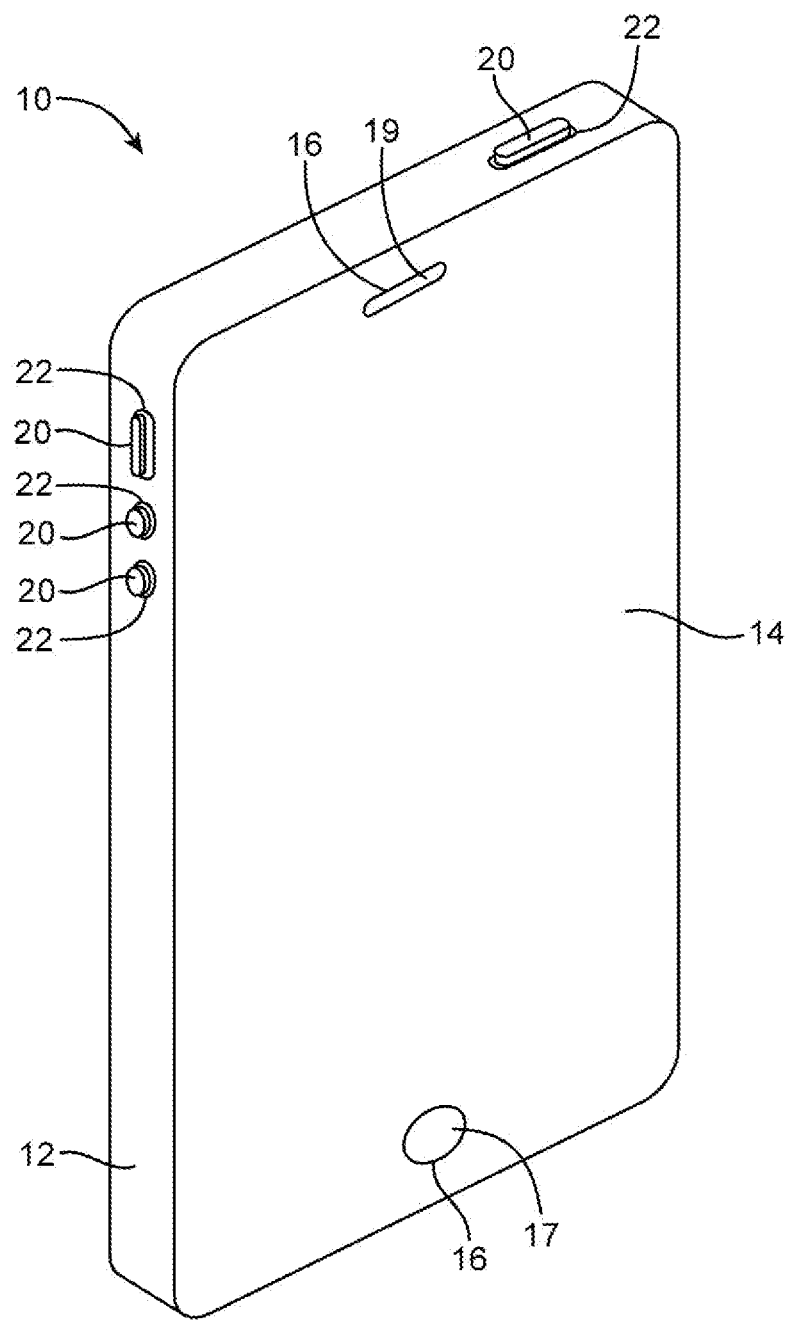
FIG. 1 is a perspective view of an illustrative electronic device with an environmental sensor in accordance with embodiments of the present invention.

An illustrative electronic device that may be provided with an environmental sensor mounted to a conductive outer structure of the device (e.g., a button-mounted environmental sensor) is shown in FIG. 1. Electronic devices such as device 10 of FIG. 1 may be cellular telephones, media players, other handheld portable devices, somewhat smaller portable devices such as wrist-watch devices, pendant devices, or other wearable or miniature devices, gaming equipment, tablet computers, notebook computers, desktop computers, televisions, computer monitors, computers integrated into computer displays, or other electronic equipment.

As shown in the example of FIG. 1, device 10 may include a display such as display 14. Display 14 may be mounted in a housing such as housing 12. Housing 12 may have upper and lower portions joined by a hinge (e.g., in a laptop computer) or may form a structure without a hinge, as shown in FIG. 1. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Device 10 may have internal user interface components such as buttons 17 or speaker component 19 that occupy openings such as openings 16 in an optional rigid cover layer of display 14. Device 10 may include additional buttons such as buttons 20 that occupy openings such as openings 22 in housing 12. Buttons 17 and 20 may be based on dome switches or other switch circuitry.

Buttons 17 and/or buttons 20 may include button members that form push buttons (e.g., momentary buttons), slider switches, rocker switches, etc. Buttons 17 and/or buttons 20 may form power buttons that power on or power off the device when actuated, volume buttons that raise or lower the volume of audio output from a speaker when actuated, mode switches that change an operational mode of the device (e.g., from a sleep mode to an active mode, from a sound-emitting mode to a silent mode, etc.) when actuated, menu buttons, home buttons or other buttons that provide user input to device 10 when actuated.

Button members for buttons 17 and/or buttons 20 may be formed from thermally conductive or thermally non-conductive materials, electrically conductive or electrically non-conductive materials, or other materials. For example, button members for buttons 17 and 20 may be formed from plastic, polymers, metals such as aluminum or steel, or other suitable materials.

Some of buttons 17 and/or 20 that have a thermally conductive button member (e.g., an aluminum button member) may be provided with a temperature sensing component attached to the thermally conductive button member. The temperature sensing component may include a thermocouple (e.g., a pair of conductors formed from different materials such as metal alloys that generate a voltage) that is attached to the thermally conductive button member. The thermocouple may be electrically insulated from the thermally conductive button member by providing an insulating material such as an electrically insulating thermally conductive epoxy that is interposed between the thermocouple and the thermally conductive button member.

Figure 2:
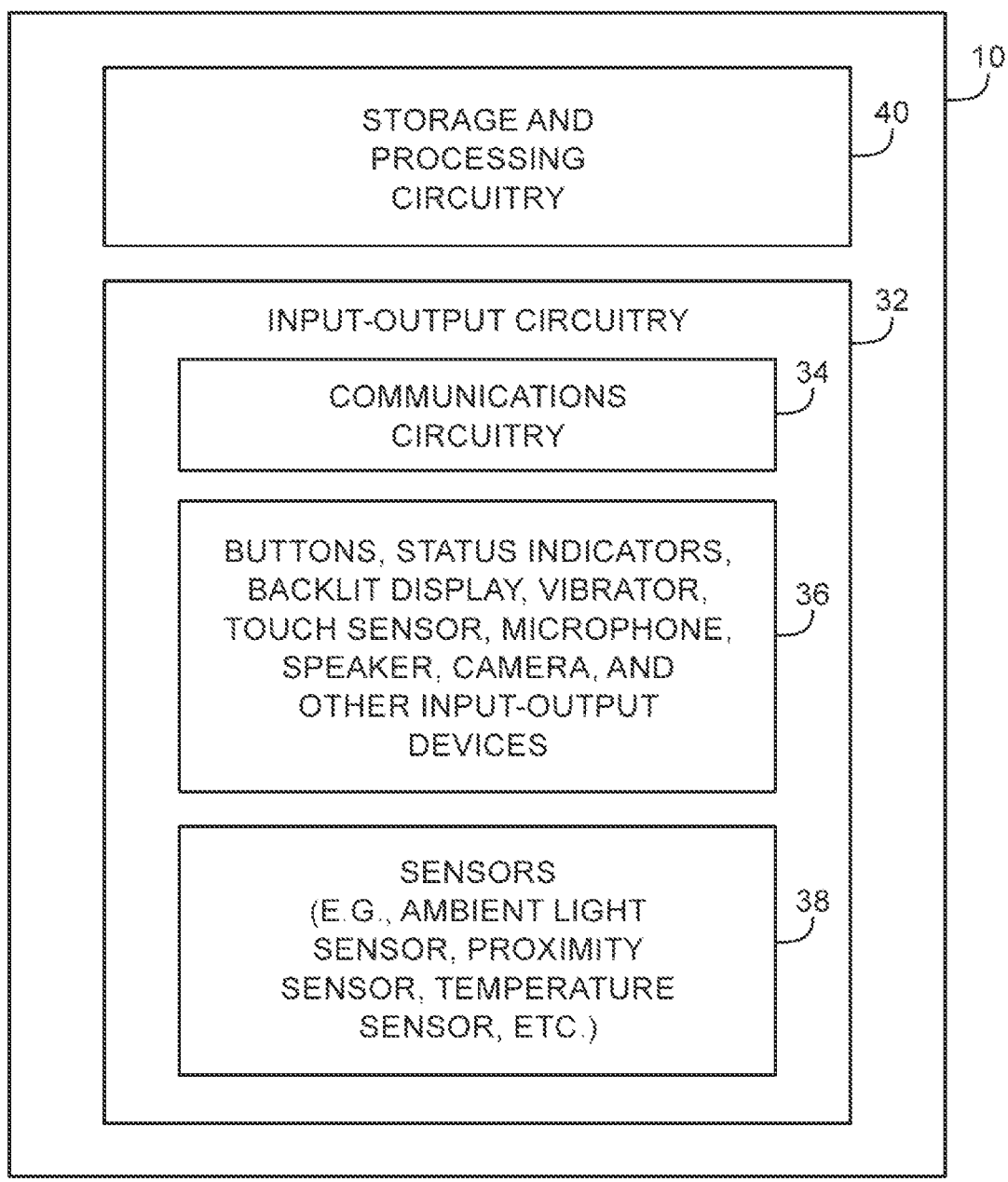
FIG. 2 is a schematic diagram of an illustrative electronic device with an environmental sensor in accordance with an embodiment of the present invention.

A schematic diagram of device 10 showing how device 10 may include sensors and other components is shown in FIG. 2. As shown in FIG. 2, electronic device 10 may include control circuitry such as storage and processing circuitry 40.

Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on a processor such as a microprocessor and other suitable integrated circuits. With one suitable arrangement, storage and processing circuitry 40 may be used to run software on device 10, such as internet browsing applications, email applications, media playback applications, operating system functions, software for capturing and processing images, software implementing functions associated with gathering and processing sensor data such as temperature data, software that makes adjustments to display brightness and touch sensor functionality, etc.

Input-output circuitry 32 may be used to allow data to be supplied to device 10 and to allow data to be provided from device 10 to external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Input-output circuitry 32 may include input-output devices 36 such as buttons 17 and 20 of FIG. 1, joysticks, click wheels, scrolling wheels, a touch screen such as display 14 of FIG. 1, other touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, and other equipment for gathering input from a user or other external source and/or generating output for a user.

Sensor circuitry such as sensors 38 of FIG. 2 may include ambient light sensors, proximity sensors, or other environmental sensors such as a pressure sensor, a temperature sensor, a humidity sensor, an accelerometer, a gyroscope, and other circuitry for making measurements of the environment surrounding device 10.

Figure 3:
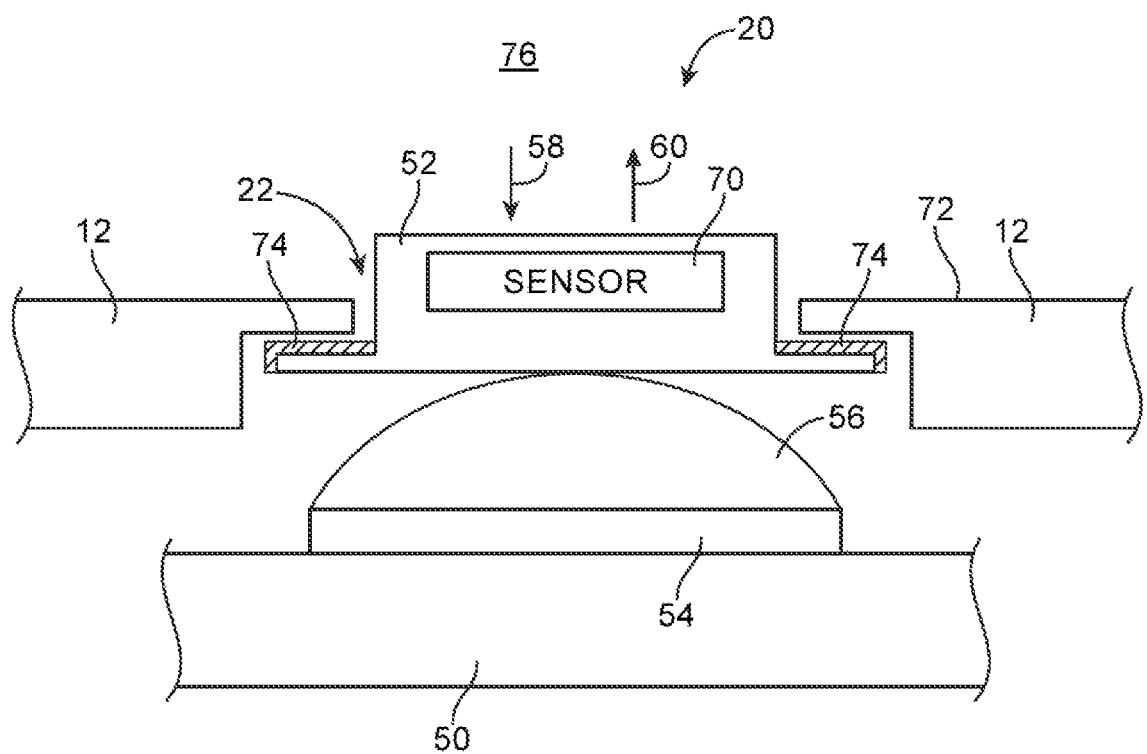
FIG. 3 is a cross-sectional side view of a portion of an illustrative electronic device in the vicinity of a button with an embedded environmental sensor in accordance with an embodiment of the present invention.

FIG. 3 is a cross-sectional side view of a portion of device 10 in the vicinity of a button such as button 20 of device 10. As shown in FIG. 3, button 20 may have a button member such as button member 52 that reciprocates within opening 22 of housing 12. When a user presses the exterior of button member 52 in direction 58, button member 52 may press against and depress a dome switch such as dome switch 56 or other switch mechanism, thereby activating the switch (e.g., shorting internal switch terminals together to close the switch).

Dome switches such as dome switch 56 may, if desired, be mounted to printed circuits such as printed circuit 54. Dome switch 56 may have a dome-shaped biasing member that pushes button member 52 outward in direction 60 when the user releases pressure from button member 52. Dome switch 56 and printed circuit 54 may be mounted to a support structure such as support structure 50. Support structure 50 may be attached to housing 12 or may be attached to other structures within device 10. Other types of switches may used for button 20 if desired, such as switches with spring-based biasing members or other biasing structures that bias button members such as button member 52. The use of a dome switch with a dome-shaped biasing structure is merely illustrative.

As shown in FIG. 3, button member 52 may include a sensor 70 such as a temperature sensor that is embedded within button member 52. Button member 52 may be formed from a conductive material having a relatively low thermal mass such as aluminum or other metal or metal alloy. Materials in external environment 76 (e.g., air, user finger's, etc.) may contact button member 52. The temperature of button member 52 may equalize to the temperature of external environment materials that contact button member 52. Sensor 70 may be used to detect the temperature of button member 52.

Sensor 70 may include thermocouple wires attached to button member 52 and electrically insulating material such as an electrically insulating adhesive that electrically insulates the thermocouple wires from button member 52. However, this is merely illustrative. Sensor 20 may be a temperature sensor based on other temperature sensing technologies.

Button member 52 may be provided with insulating material 74 (e.g., a plastic or other insulating coating) that covers a portion of button member 52. Insulating material 74 may be interposed between button member 52 and a portion of housing 12. Insulating material 74 may, for example, be a plastic member that has been molded onto button member 52, attached to button member 52 using adhesive, or otherwise formed on button member 52. Insulating material 74 may help prevent electrically conductive connections from forming between housing 12 and button member 52, thereby electrically isolating button member 52 from housing 12. Insulating material 74 may, if desired, also be a thermally insulating material that thermally isolates button member 52 from housing 12.

Some or all of button member 52 may extend beyond outer surface 72 of housing 12. A temperature sensor such as temperature sensor 70 that is formed within button member 52 may therefore be formed at least partially outside of housing 12 and within exterior environment 76.

The configuration of button 20 and sensor 70 of FIG. 3 in which sensor 70 is embedded within button member 52 is merely illustrative. If desired, sensor 70 may be attached to button member 52 in a recess such as recess 78 in button member 52 as shown in FIG. 4.

Figure 4:
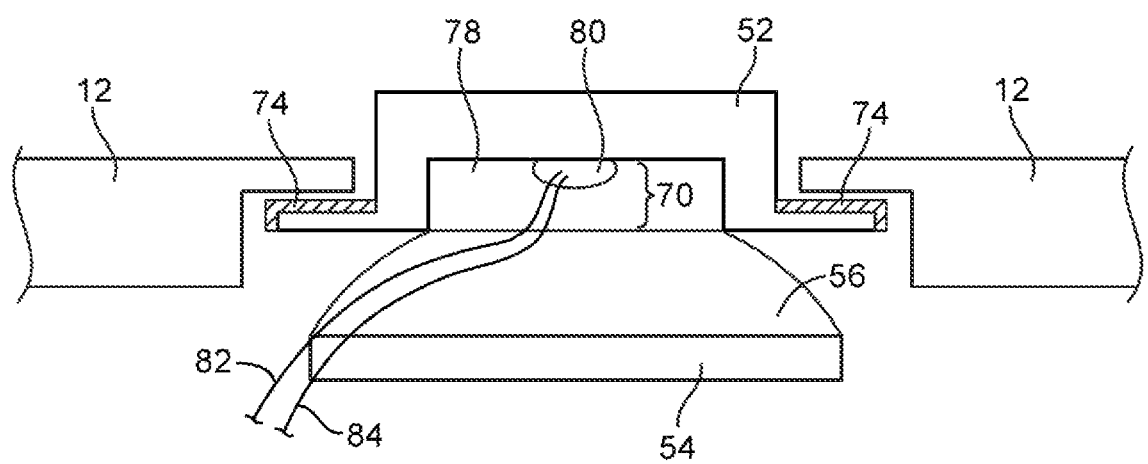
FIG. 4 is a cross-sectional side view of a portion of an illustrative electronic device in the vicinity of a button with a recess and an environmental sensor mounted in the recess in accordance with an embodiment of the present invention.

In the example of FIG. 4, sensor 70 is formed from a pair of thermocouple wires 82 and 84 attached to an inner surface of button member 52 in recess 78 using adhesive 80. Adhesive 80 may, for example, be an electrically insulating thermally conductive epoxy that electrically insulates wires 82 and 84 from button member 52 while thermally coupling wires 82 and 84 to button member 52.

Wire 82 may be formed from a first type of metal. Wire 84 may be formed from a second type of metal that is different from the first type of metal. Wire 82 and wire 84 may contact each other within adhesive 80. Because wires 82 and 84 are formed from two different types of metal, a voltage may be produced across wires 82 and 84 that depends on the temperature of button member 52 and therefore depends on the temperature of any external materials that are in contact with button member 52. Wires 82 and 84 may be coupled to other circuitry in device 10 such as storage and processing circuitry 40 of FIG. 2. Temperature data may be generated by storage and processing circuitry 40 based on the voltage across wires 82 and 84.

Figure 5:
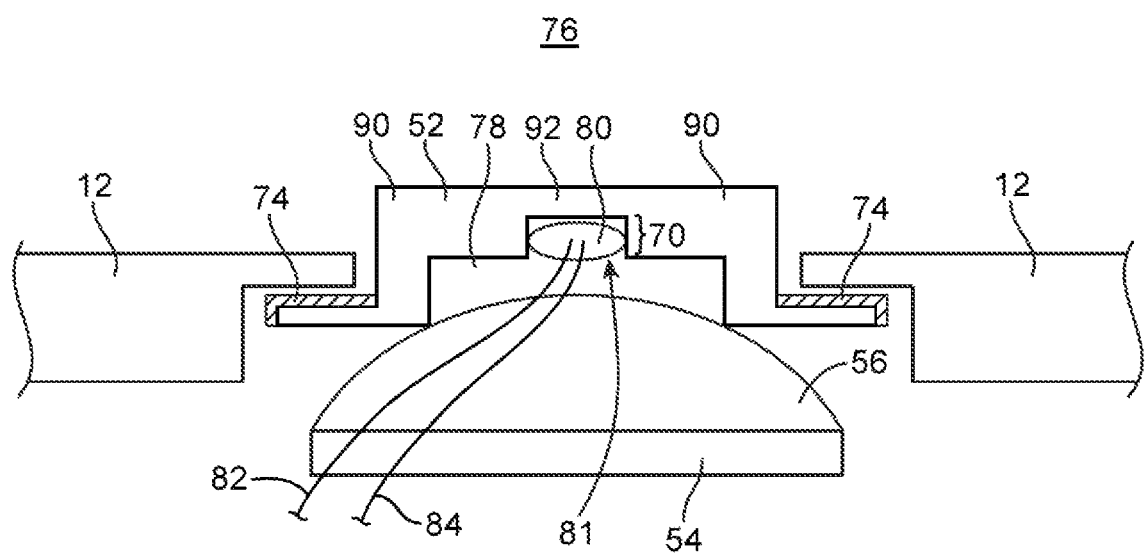
FIG. 5 is a cross-sectional side view of a portion of an illustrative electronic device in the vicinity of a button with multiple recesses and an environmental sensor mounted in one of the recesses in accordance with an embodiment of the present invention.

If desired, button member 52 may be provided with an additional recess such as recess 81 of FIG. 5. As shown in FIG. 5, recess 81 may be formed within recess 78 of button member 52. Thermocouple wires 82 and 84 may be attached to button member 52 within additional recess 81 using adhesive 80. Button member 52 may have relatively thicker portions 90 on opposing sides of additional recess 81 that provide strength for button member 52 and a relatively thinner portion 92 interposed between sensor 70 and exterior environment 76. In this way, sensor 70 may be located relatively close to exterior environment 76 without compromising the strength of button member 52.

Figure 6:
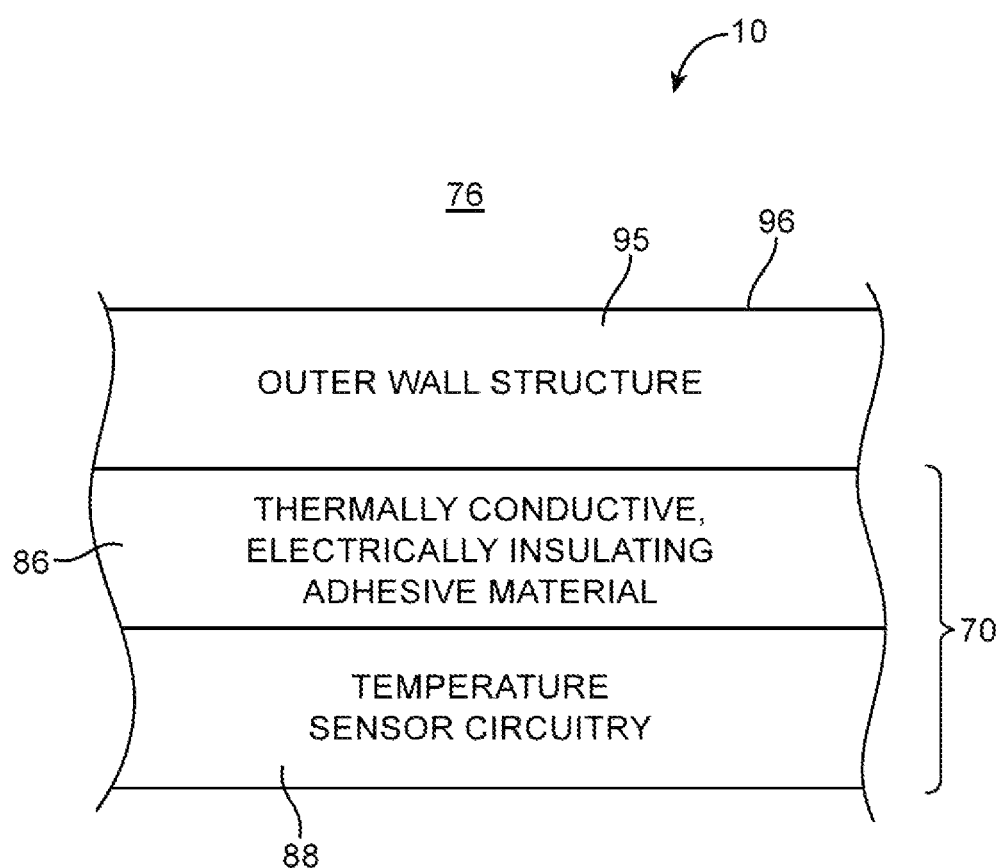
FIG. 6 is a diagram of an illustrative temperature sensor layer that is attached to a outer wall structure of an electronic device in accordance with an embodiment of the present invention.

The examples described above in connection with FIGS. 4, and 5 in which temperature sensor 70 is formed from thermocouple wires and an electrically insulating adhesive attached to button member 52 are merely illustrative. In general, temperature sensor 70 may be formed from any suitable type of temperature sensing circuitry that is thermally coupled to a conductive outer surface of device 10 as shown in FIG. 6. Temperature sensor circuitry 88 may be attached to any outer wall structure 95 of device 10 using any type of adhesive such as thermally conductive electrically isolating adhesive material 86.

Outer wall structure 95 may be a portion of button member 52, a portion of housing 12, a portion of an outer layer of display 14, or any other thermally conductive structure of device 10 having an outer surface 96 in contact with exterior environment 76. Outer wall structure 95 may be formed from electrically conductive materials (e.g., metal) or electrically insulating materials (e.g., plastic, ceramic, etc.).

In configurations in which outer wall structure 95 is formed from an electrically conductive material, adhesive material 86 may be a thermally conductive electrically isolating adhesive material as shown in FIG. 6. However, this is merely illustrative. If desired, outer wall structure 95 may be formed from an electrically insulating material such as plastic and adhesive 86 may be any suitable adhesive that is configured to allow heat to flow to temperature sensing circuitry 88 without forming electrical connections between circuitry 88 and other portions of device 10.

Temperature sensing circuitry 88 may be circuitry that is based on thermocouple, thermistor, or other temperature sensing technologies. Temperature sensing circuitry 88 may be an integrated circuit or other packaged temperature sensing circuitry. Adhesive material 86 may be formed from epoxy, resin, silicone or other suitable thermally conductive electrically insulating adhesive materials or combinations of materials. Adhesive material 86 may include aluminum or other metal additives that help increase the thermal conductivity of material 86.

During operation of device 10, temperature data from temperature sensor 70 may be used in controlling the operation of device 10. For example, when temperature measurements from sensor 70 indicate that device 10 is located in an operating environment that is too hot or too cold (e.g., the detected environmental temperature is outside of a predetermined range of acceptable operating temperatures), device 10 can be placed in a safe mode or may be powered off. However, this is merely illustrative. If desired, a user of device 10 may launch a temperature measurement application that determines the temperature of a material that is in contact with button member 52 using temperature sensor 70 and provides temperature measurements to the user (e.g., using display 14). For example, a user may measure the temperature of the air surrounding the device or may place the button member against a person's skin for determining the person's body temperature.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
   a housing;
   a button having a thermally conductive portion; and
   a temperature sensor attached to the thermally conductive portion of the button, wherein the button comprises a switch and a button member that actuates the switch, wherein the button member comprises the thermally conductive portion of the button, wherein the button member further comprises an insulating material interposed between the thermally conductive portion and the housing.

2. The electronic device defined in claim 1 wherein the button comprises a power button for the electronic device.

3. The electronic device defined in claim 1 wherein the thermally conductive portion of the button is formed in contact with environmental materials that are exterior to the electronic device and that have a temperature and wherein the temperature sensor is configured to sense the temperature of the environmental materials.

4. The electronic device defined in claim 3 wherein the switch comprises a dome switch.

5. The electronic device defined in claim 3 wherein the housing has at least one opening and wherein the button member is located at least partially in the opening.

6. The electronic device defined in claim 5 wherein the housing has an outer surface and wherein a portion of the button member extends out of the opening beyond the outer surface of the housing.

7. An electronic device, comprising:
a housing structure;
an opening in the housing structure;
a button having a button member located in the opening; and
a temperature sensor mounted to the button member, wherein the button member comprises a first recess, wherein the button member comprises a second recess formed in the first recess, and wherein the temperature sensor is attached to the button member in the second recess.

8. The electronic device defined in claim 7, further comprising adhesive that attaches the temperature sensor to the button member in the second recess.

9. The electronic device defined in claim 8 wherein the adhesive comprises a thermally conductive electrically insulating adhesive.

10. An electronic device, comprising:
a button that includes a switch and a thermally conductive button member that activates the switch, wherein the thermally conductive button member forms a portion of an exterior of the electronic device;
a temperature sensor attached to the thermally conductive button member; and
a housing with an opening, wherein the housing overlaps a first portion of the thermally conductive button member.

11. The electronic device defined in claim 10, further comprising a recess interposed between the switch and the thermally conductive button member, wherein the temperature sensor is attached to the thermally conductive button member in the recess.

12. The electronic device defined in claim 10, wherein the housing has an outer surface and wherein a second portion of the thermally conductive button member extends out of the opening beyond the outer surface of the housing.

13. The electronic device defined in claim 12, wherein the temperature sensor is attached to the second portion of the thermally conductive button member.

14. The electronic device defined in claim 12, wherein the second portion of the thermally conductive button member has first and second opposing surfaces, wherein the first surface forms the portion of the exterior of the electronic device, and wherein the temperature sensor is attached to the second surface of the second portion.

* * * * *